United States Patent [19]
Maruyama et al.

[11] Patent Number: 6,118,477
[45] Date of Patent: Sep. 12, 2000

[54] PICTURE READING APPARATUS

[75] Inventors: Masahide Maruyama; Mitsuyoshi Shindo, both of Kanagawa; Kiyosuke Suzuki, Saitama; Tomohiro Maekawa; Hideki Wanami, both of Kanagawa, all of Japan

[73] Assignee: Sony Corporation, Tokyo, Japan

[21] Appl. No.: 09/310,012

[22] Filed: May 11, 1999

Related U.S. Application Data

[62] Division of application No. 08/718,595, filed as application No. PCT/JP96/00277, Feb. 8, 1996, Pat. No. 5,949,479.

[30] Foreign Application Priority Data

Feb. 8, 1995 [JP] Japan .................................. 7-020823
Jun. 13, 1995 [JP] Japan .................................. 7-146355

[51] Int. Cl.[7] .................................................. H04N 5/253
[52] U.S. Cl. ............................ 348/90; 348/97; 348/107
[58] Field of Search .................................. 348/95, 96, 97, 348/98, 99, 102, 105, 107; 235/462; 386/127, 129; 358/487, 527; H04N 5/253

[56] References Cited

U.S. PATENT DOCUMENTS

| | | | |
|---|---|---|---|
| 2,890,277 | 6/1959 | Duke .......................................... | 348/97 |
| 4,660,691 | 4/1987 | Nutting ...................................... | 348/97 |
| 5,122,645 | 6/1992 | Sacke et al. ............................. | 235/462 |
| 5,157,482 | 10/1992 | Cosgrove .................................. | 358/54 |
| 5,223,954 | 6/1993 | Miyakawa et al. ...................... | 358/474 |
| 5,430,477 | 7/1995 | Bachmann et al. ........................ | 348/97 |
| 5,565,912 | 10/1996 | Easterly et al. ............................ | 348/96 |
| 5,623,303 | 4/1997 | Inoue et al. ............................... | 348/96 |
| 5,633,733 | 5/1997 | Miyazame .................................. | 348/96 |
| 5,633,977 | 5/1997 | Inoue et al. ............................... | 386/127 |
| 5,644,356 | 7/1997 | Swinsion et al. ......................... | 348/96 |
| 5,740,312 | 4/1998 | Tanaka et al. ........................... | 386/129 |
| 5,754,314 | 5/1998 | Araki et al. ............................... | 348/97 |
| 5,790,187 | 8/1998 | Suzuki ...................................... | 348/96 |
| 5,861,911 | 1/1999 | Oasaka et al. ............................. | 348/96 |
| 5,949,479 | 9/1999 | Maruyama et al. ...................... | 348/97 |

FOREIGN PATENT DOCUMENTS

| | | | |
|---|---|---|---|
| 0 416 654 A2 | 3/1991 | European Pat. Off. ......... | H04N 1/46 |
| 0 530 027 A2 | 3/1993 | European Pat. Off. ......... | H04N 1/10 |
| 3-96174 | 4/1991 | Japan ............................... | H04N 1/46 |
| 4-362849 | 12/1992 | Japan ............................... | H04N 1/00 |
| 5-244349 | 9/1993 | Japan ............................... | H04N 1/04 |
| 7-212535 | 8/1995 | Japan ............................... | H04N 1/04 |

*Primary Examiner*—Howard Britton
*Assistant Examiner*—Tung Vo
*Attorney, Agent, or Firm*—Limbach & Limbach L.L.P.

[57] ABSTRACT

In a picture reading apparatus, in the pre-scan, an approach is employed to control a CCD line sensor 5 and a film carrying roller 103 so that plural pictures recorded on an optical film 1 are read at a predetermined sampling rate in order from the latest frame to generate frame position data indicating position of left and right ends of frame, etc. Further, in the main scan, an approach is employed such that, in controlling the CCD line sensor 5 and a film carrier 100 so that plural pictures recorded on the optical film are read at a sampling rate higher than the predetermined sampling rate in order from the oldest frame, the reading start and end timings of the CCD line sensor 5 are controlled on the basis of frame position data obtained by the pre-scan. As a result, in this picture reading apparatus, it is possible to precisely obtain picture data of picture of frame in the state where no positional shift takes place. In addition, since the pre-scan is carried out at a low sampling rate, frame position data can be obtained in a short time.

15 Claims, 6 Drawing Sheets

PICTURE READING APPARATUS

This application is a division of Ser. No. 08/718,595 filed Sep. 26, 1996 now U.S. Pat. No. 5,949,479, which is a 371 of PCT/JP96/00277 filed Feb. 8, 1996.

TECHNICAL FIELD

This invention relates to a system of reading data on an optical film such as a picture reading apparatus for reading pictures (pictorial images) recorded in frame units on an optical film, or the like.

BACKGROUND ART

Generally, as a picture reading apparatus for reading a photographic manuscript to change it into electronic (picture) information, scanners of the flat bed type or scanners of the handy type used as the computer peripheral equipment, image scanners for facsimile, etc. as monochrome, and the like are well known. For example, in the flat bed type scanner as the computer peripheral equipment, a manuscript set (placed) on the manuscript mounting table is directly scanned by the CCD (Charge Coupled Device) line sensor to thereby read picture information such as characters, graphics, and/or picture images, etc. on the manuscript.

At this time, the manuscript set on the manuscript mounting table is fixed, and the light source for irradiating light onto the manuscript and the CCD line sensor where a reflected light from the manuscript is focused are moved with respect to the manuscript set on the manuscript mounting table, whereby picture information on the manuscript is read. Moreover, for size designation of the manuscript thus set and/or improvement in picture quality, pre-scan operation depending upon computer is first carried out. Further, after such pre-scan operation is completed, the main scan operation for reading picture information is carried out.

The picture information on the manuscript which have been read in this way are inputted to the computer respective an input picture signals. The computer converts the input picture signals obtained by the flat bed type scanner as described above into picture display signals to display picture images based on these picture display signals on the display unit connected to the computer.

However, since the conventional picture reading apparatuses carry out the picture reading operation basically in a manner dependent upon the computer, those apparatuses are not suitable for reading picture information of a large of manuscripts at a high speed. Moreover, in order to read a large number of manuscripts, much processing time was required. In addition, also with respect to color correction, etc., color correction processing based on the experiment, or the like was required. As a result, much time was required until one manuscript can be completely read.

This invention has been made in view of actual circumstances of the prior arts as described above, and an object of this invention is to provide a picture reading apparatus adapted to change pictures (pictorial images) recorded on an optical film developed in, e.g., processing laboratory for optical film, etc. into electronic information, i.e., to convert such pictures into picture data to display, on the monitor, picture images based on the picture data, and/or to automatically read pictures of plural frames recorded on the optical film to record those pictures as the picture data which have been changed into electronic information onto a recording medium.

DISCLOSURE OF THE INVENTION

A picture reading apparatus according to this invention is directed to a picture reading apparatus for reading pictures (pictorial images) recorded in frame units on an optical film, which comprises: picture reading means for reading the pictures on the optical film to convert them into electric picture data; film carrying means for relatively carrying (transferring) the optical film with respect to the picture reading means; and control means such that, in a first reading process, it controls the picture reading means and the film carrying means so that the plural pictures recorded on the optical film are read at a first sampling rate in a first order, and that, in a second reading process, it controls the picture reading means and the film carrying means so that the plural pictures recorded on the optical film are read at a second sampling rate higher than the first sampling rate in a second order which is a direction opposite to the first order.

In this picture reading apparatus, in the first reading process, plural pictures recorded on the optical film are read at the first sampling rate in the first order to generate, e.g., frame position data. Subsequently, in the second reading process, plural pictures recorded on the optical disc are read at the second sampling rate higher than the first sampling rate in the second order which is the opposite direction to the first order on the basis of the frame position data. In addition, in this picture reading apparatus, picture data obtained in the second process are recorded onto a recording medium.

Moreover, a reading apparatus according to this invention is directed to a reading apparatus for reading data on an optical film, which comprises: reading means for reading the data on the optical film to convert them into electric data; film carrying means including a first film carrying mechanism for relatively carrying, at a first feed speed, the optical film with respect to the reading means, and a second film carrying mechanism for supporting the first film carrying mechanism and adapted for moving the first film carrying mechanism at a second feed speed with respect to the reading means; and control means such that, in a first reading process, it controls the reading means and the first film carrying mechanism so that the data on the optical film is read at a first sampling rate, and that, in a second reading process, it allows the optical film to undergo positioning on the first film carrying mechanism thereafter to control the reading means and the second film carrying mechanism so that the data on the optical film is read at a second sampling rate higher than the first sampling rate.

In addition, a reading method according to this invention is directed to a reading method in a reading apparatus comprising reading means for reading data on an optical film to convert it into electric data, first film carrying means for relatively carrying, at a first feed speed, the optical film with respect to the reading means, and second film carrying means for moving, at a second feed speed, the first film carrying means with respect to the reading means, the method comprising: a first step of reading, at a first sampling rate, the data on the optical film by the reading means while continuously carrying, in a first direction, the optical film by the first film carrying means; a second step of processing the data which has been read at the first step to judge, every frames, a position where the data on the optical film exists to prepare frame position data; and a third step of carrying the optical film in a second direction by the first film carrying means to allow it to undergo positioning thereafter to drive the reading means on the basis of the frame position data while carrying the optical film by the second film carrying means to read the data on the optical film at a second sampling rate higher than the first sampling rate.

BEST MODE FOR CARRYING OUT THE INVENTION

A preferred embodiment of a picture reading apparatus according to this invention will now be described in detail with reference to the attached drawings.

Figure 1:
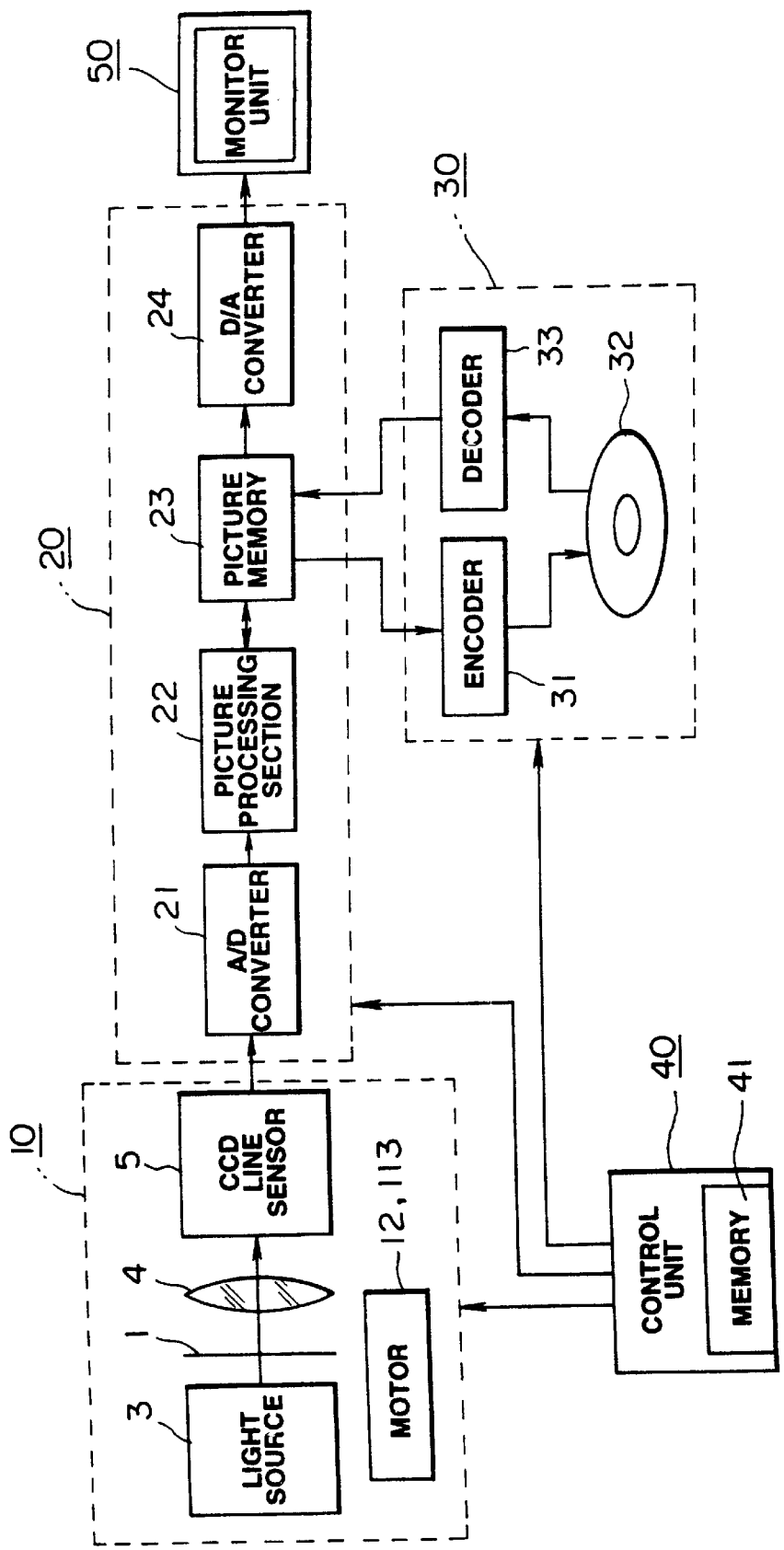
FIG. 1 is a block diagram showing the configuration of a picture reading apparatus according to this invention.

The picture reading apparatus according to this invention comprises, as shown in FIG. 1, for example, a scanner unit 10 for reading pictures (pictorial images) of respective frames recorded on an optical film 1, a signal processing unit 20 for converting an image pick-up signal from the scanner unit 10 into picture data, a recording/reproduction unit 30 for recording, onto a recording medium, the picture data from the signal processing unit 20, a control unit 40 for controlling the scanner unit 10, the signal processing unit 20 and the recording/reproduction unit 30, and a monitor unit 50 for displaying picture image based on the picture data from the signal processing unit 20.

Figure 2A:
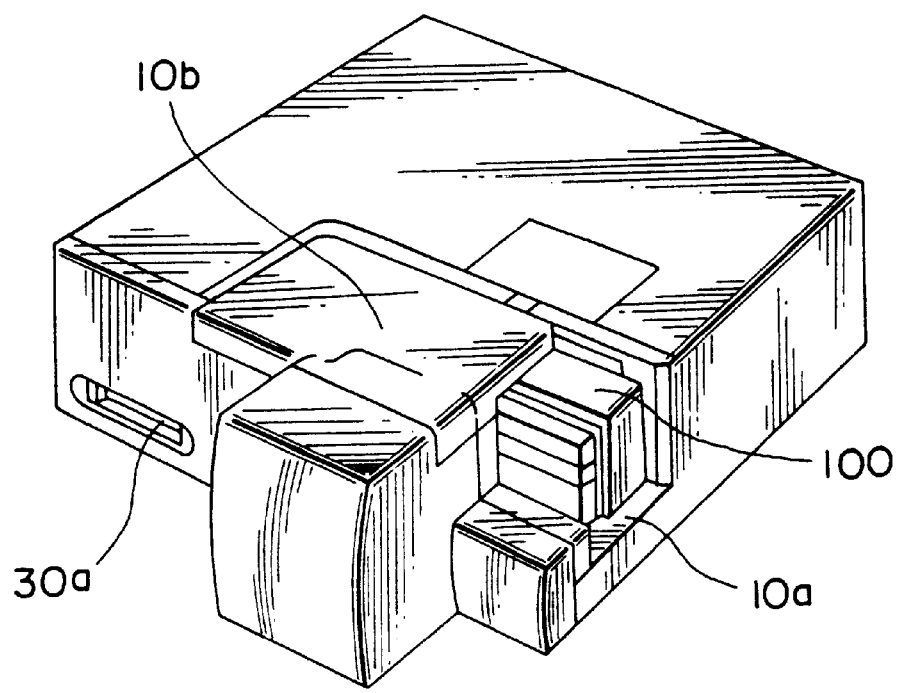
FIGS. 2A and 2B are perspective views showing appearance of the picture reading apparatus.
Figure 2B:
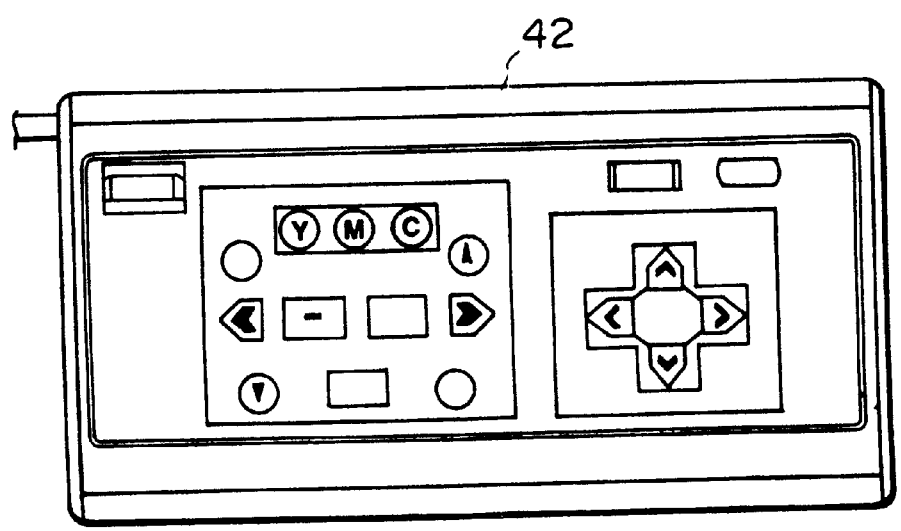

At the casing side portion of the picture reading apparatus, as shown in FIG. 2A, for example, there is provided a carrier mounting (attachment) portion 10a for mounting (loading) a film carrier 100 for holding and carrying the optical film 1. Moreover, at the upper surface portion of the casing, there is provided a carrier cover 10b which is opened/closed when the film carrier 100 is caused to undergo loading/unloading. Further, at the front of the casing, there is provided a disc insertion portion 30a for inserting a recording medium, e.g., a magneto-optical disc 32 for recording the picture data which has been read at the scanner unit 10. In addition, a keyboard 42 shown in FIG. 2b is connected to the picture reading apparatus, and the keyboard 42 is operated, thereby making it possible to carry out various operations of the picture reading apparatus.

Respective components will now be described with reference to the block diagram of the picture reading apparatus shown in FIG. 1 and the perspective view showing the appearance of the picture reading apparatus shown in FIG. 2.

The scanner unit 10 comprises a film feed section for moving the optical film 1 on which plural pictures (pictorial images) are recorded in frame units, and a picture reading section for reading, in frame units, the pictures recorded on the optical film 1.

The film feed section comprises a carrier movement motor 12, and a film carrying (transferring) motor 113 which are driven by the control unit 40. At the film feed section, at the time of pre-scan which will be described later, the optical film 1 is carried (transferred) by the film carrying motor 113, and at the time of main scan, the film carrier 100 which has held the optical film 1 is moved by the carrier movement motor 12.

On the other hand, the picture reading section comprises a light source 3 for irradiating an image pick-up light onto the optical film 1, and a CCD (Charge Coupled Device) line sensor 5 adapted for receiving, through a lens 4, the image pick-up light which has been passed through the optical film 1, and adapted for reading the pictures recorded on the optical film 1 in a linear sequential manner every line by the CCD line sensor 5.

It is to be noted that the scanner unit 10 may carry out frame-feed of the optical film 1 by the film feed section to read, in frame units, pictures recorded on the optical film 1 by using area sensor by the picture reading section.

The signal processing unit 20 comprises, as shown in the FIG. 1 mentioned above, an A/D converter 21 for converting an image pick-up signal from the CCD line sensor 5 into picture data, a picture processing section 22 for implementing a predetermined signal processing to the picture data delivered from the A/D converter 21, a picture (pictorial image) memory 23 for temporarily storing the picture data from the picture processing section 22, and a D/A converter 24 for converting the picture data from the picture memory 23 into a video signal. Thus, this signal processing unit 20 converts the image pick-up signal delivered from the CCD line sensor 5 into picture data, e.g., at two sampling rates different from each other to store it into the picture memory 23, and to convert the picture data stored in the picture memory 23 into a video signal to deliver it to the monitor unit 50, and to deliver picture data obtained by the main scan to the recording/reproduction unit 30.

The recording/reproduction unit 30 comprises, as shown in the FIG. 1 mentioned above, an encoder 31 for encoding the picture data which has been read out from the picture memory 23 on the basis of a predetermined code rule, the magneto-optical disc 32 for recording picture data encoded by the encoder 31, and a decoder 33 for decoding the picture data which has been read out from the magneto-optical disc 32. Thus, this recording/reproduction unit 30 encodes the picture data which has been read out from the picture memory 23 by the code rule suitable for recording of the magneto-optical disc 32 to record encoded picture data thus obtained onto the magneto-optical disc 32, and reads out the picture data from the magneto-optical disc 32 to decode such picture data to deliver it to the picture memory 23.

Figure 3:
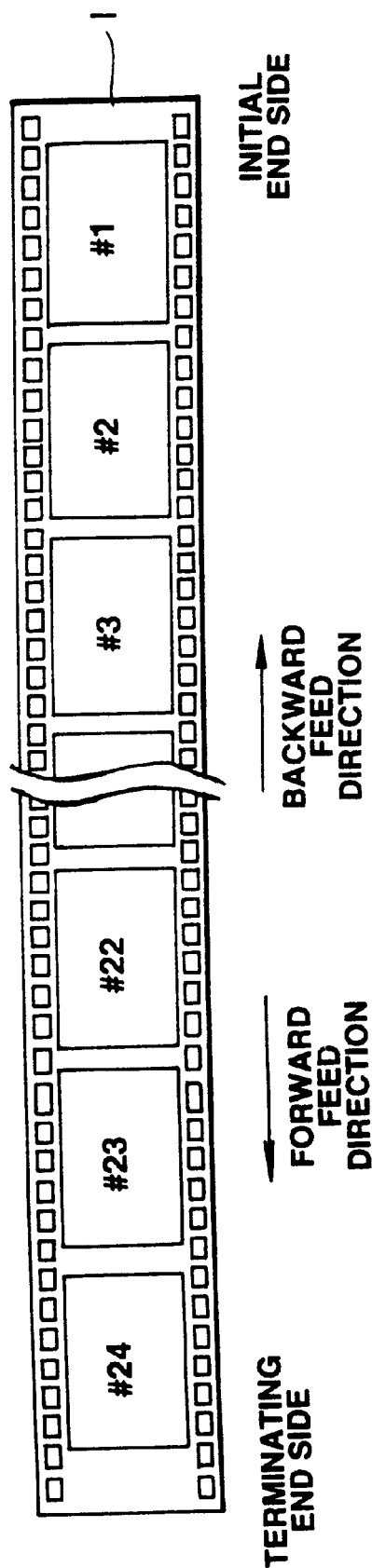
FIG. 3 is a view showing photographic film for explaining the initial end side and the terminating end side of the photographic film and feed direction of film.

Definition of the initial end side and the terminating end side of the optical film 1, e.g., photographic film and definition of feed direction of film in this embodiment will now be described with reference to FIG. 3. FIG. 3 shows, e.g., photographic film for taking 24 pictures (frames). The order of frames photographed (recorded) is designated by numerals (figures). Namely, pictures (pictorial images) are recorded in order from frame #1 to frame #24, wherein the oldest picture (picture first photographed) is recorded within the frame #1, and the latest picture (picture photographed last) is recorded within the frame #24.

It is now assumed that the initial end side of the film is the oldest frame #1 side and the terminating end side of the film is the latest frame #24 side. In addition, in this embodiment, the forward direction of the film feed direction (forward feed direction) is assumed to be a direction to feed the film such that the CCD line sensor 5 sequentially scan respective frames up to the frame #1 starting from the frame #24, and the opposite direction of the film feed direction (backward feed direction) is assumed to be a direction to feed the film such that the CCD line sensor 5 sequentially scans respective frames up to the frame #24 starting from the frame #1.

In operation, in this picture reading apparatus, at the time of the pre-scan which will be described later, the optical film is carried (transferred) at a predetermined speed in the forward feed direction to take thereinto picture data at a predetermined sampling rate in order from the latest frame. At the time of the main scan, the optical film 1 is carried (transferred) at a speed lower than the predetermined speed in the backward feed direction to take thereinto picture data at a sampling rate higher than the predetermined sampling rate in order from the oldest frame to record the picture data obtained in this order onto the magneto-optical disc 32.

The film carrier 100 for holding the optical film 1 will now be described in a more practical sense.

Figure 4:
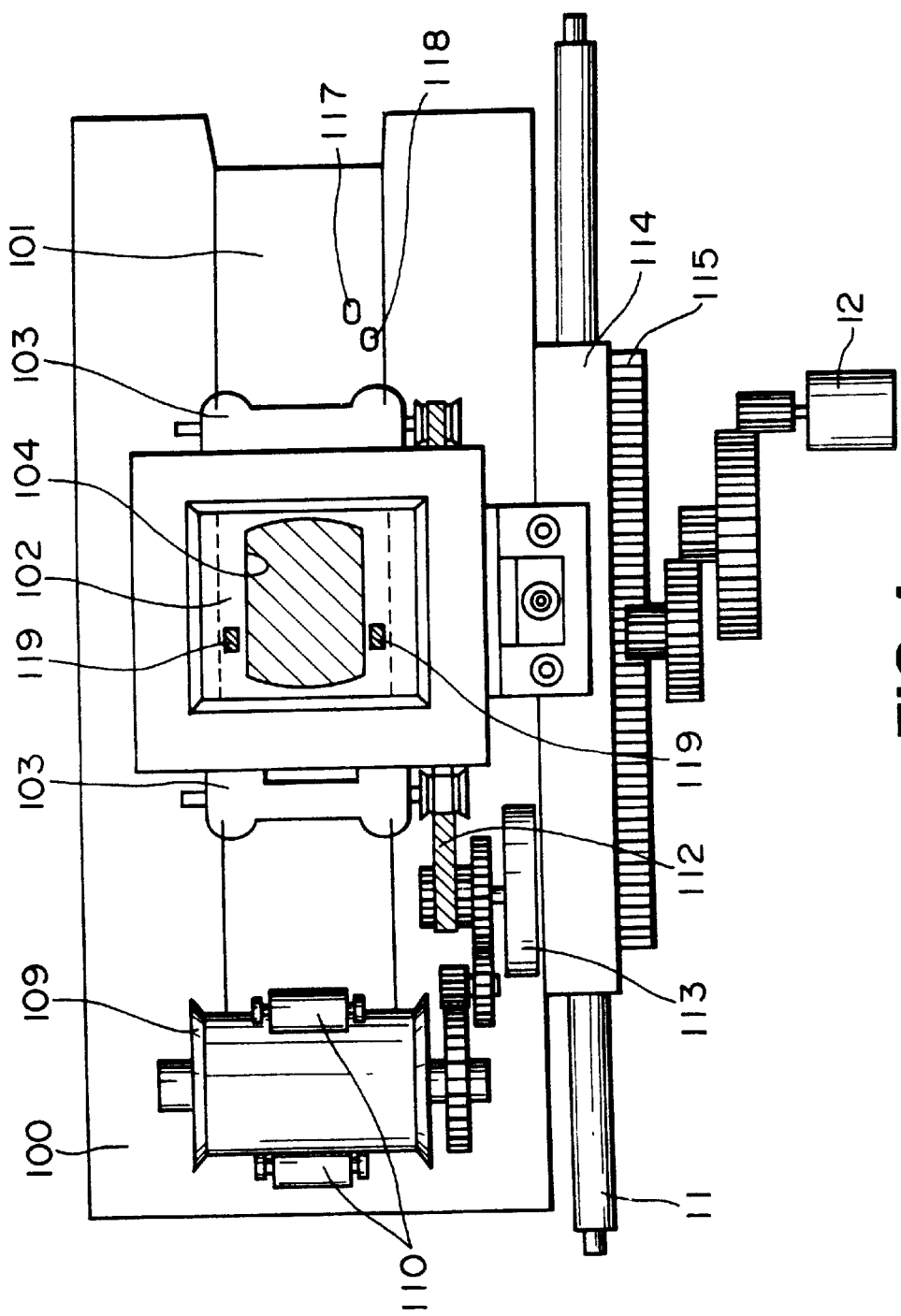
FIG. 4 is a view showing the configuration of film carrier of the picture reading apparatus.

As shown in FIG. 4, for example, the film carrier 100 is detachably attached to the carrier mounting (attachment) portion 10a of the picture reading apparatus, and is provided so that it can be moved with respect to the CCD line sensor 5. This film carrier 100 includes a film guide portion 101 for guiding the optical film 1 inserted from the right side in the figure. At the film insertion side of the film guide portion 101, there are provided a film detection sensor 117 for detecting a presence or absence of the optical film 1, and a perforation detection sensor 118 for detecting perforation of the optical film 1. These sensors 117, 118 are comprised of, e.g., an optical sensor of the reflection type, and are adapted for receiving light reflected on the surface of the optical film 1 to thereby detect presence or absence of the optical film 1 or perforation thereof.

Moreover, the film carrier 100 includes, as shown in the FIG. 4 mentioned above, a pair of film carrying rollers 103 for carrying (transferring), in further depth direction, the optical disc 1 inserted into the film guide portion 101. Substantially at the middle of these pair of film carrying rollers 103, there is provided a film holding plate 102 for holding (putting) the optical film 1 between the film holding plate 102 and the film guide portion 101 in order that the optical film 1 is not caused to float from the film guide portion 101. It is to be noted that the holding force of the film by the film holding plate 102 is caused to have strength such that there is no obstacle in carrying (transfer) of the film. Further, at the film holding plate 102, an opening portion 104 for scanning picture recorded on the optical film 1 by the CCD line sensor 5 is provided at the position opposite to the CCD line sensor 5. In addition, at the film holding plate 102, a pair of holes 119 are provided at the upper and lower sides in the figure of the opening 104. These holes 119 are a hole for detecting perforation of the optical film 1 by the CCD line sensor 5. Namely, this picture reading apparatus is adapted so that when the optical film 1 is carried (transferred) and is passed through position of these holes 119, presence or absence of hole of the perforation can be detected on the basis of an image pick-up signal of the CCD line sensor 5.

Further, the film carrier 100 includes, as shown in the FIG. 4 mentioned above, a winding roller 109 for winding the optical film 1 carried (transferred) in further depth direction. At the winding surface of the winding roller 109, a guide roller 110 for allowing the optical film 1 to be wound on the winding roller 109 is provided so that it is biased toward the winding surface side of the winding roller 109.

Further, the film carrier 100 includes, as shown in the FIG. 4 mentioned above, the film carrying motor 113 for rotationally driving the film carrying rollers 103 and the winding roller 109. Drive force of the film carrying motor 113 is transmitted to the winding roller 109 through a gear train, and is transmitted to the film carrying roller 103 through the gear train and a belt 112. It is to be noted that, in carrying the optical film 1 in the forward feed direction, the film carrying rollers 103 are rotationally driven in an opposite direction. However, since clutch mechanism (not shown) provided at the gear train is caused to be in non-connection state, drive force of the film carrying motor 113 is not transmitted to the winding roller 109.

At the lower end portion in the figure of the film carrier 100, a bearing portion 114 inserted through a guide shaft 11 fixed at chassis (casing) of the scanner unit 10 is provided. At the bearing portion 114, a rack 115 with which the gear which transmits drive force from the carrier movement motor 12 is meshed is provided. Accordingly, the drive force from the carrier movement motor 12 is caused to be transmitted to the rack 115, whereby the film carrier 100 can be moved along the guide shaft 11.

The operation of the pre-scan and the main scan will now be described with reference to FIGS. 5 and 6.

Figure 5:
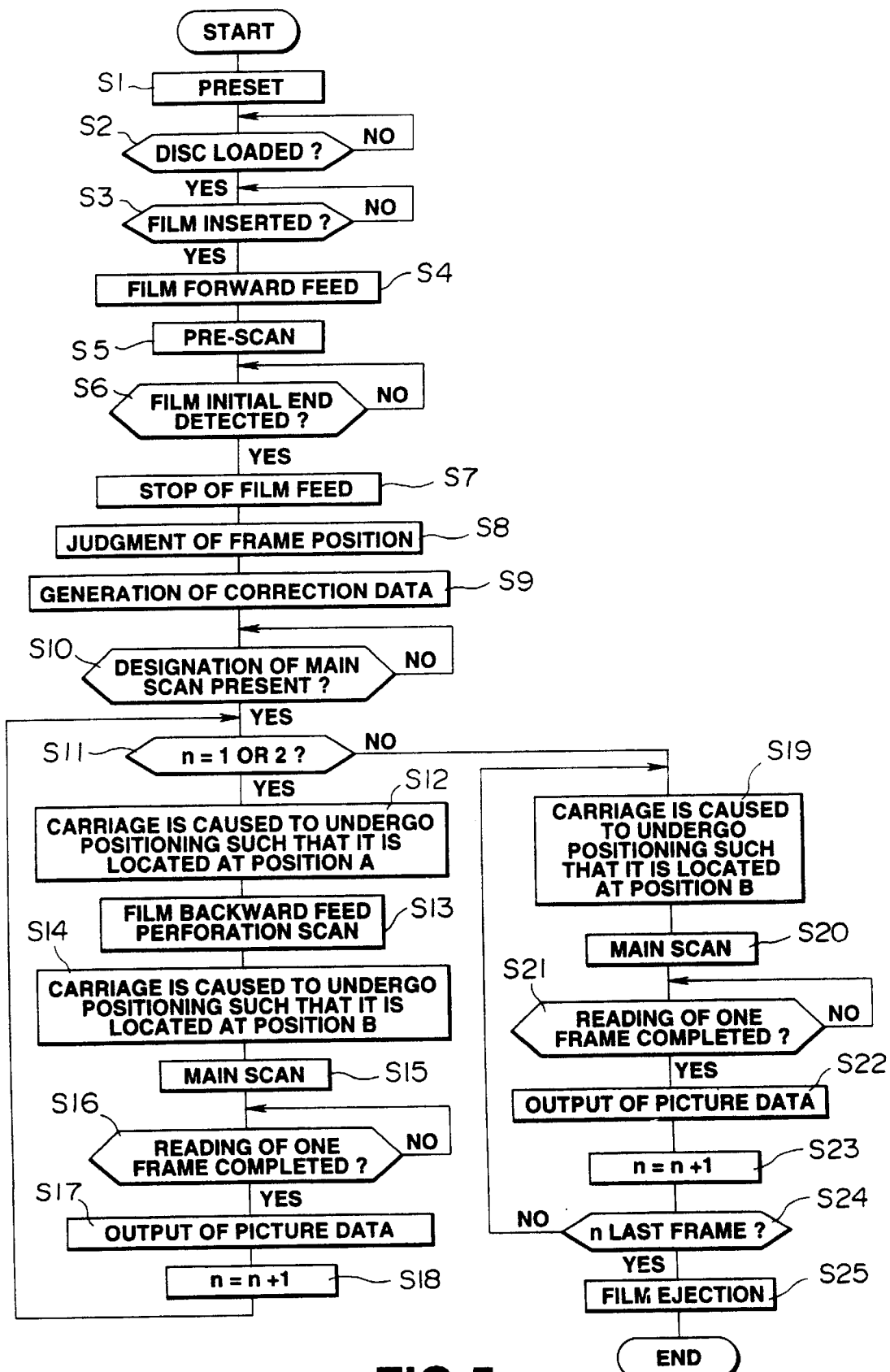
FIG. 5 is a flowchart for explaining the operation of the picture reading apparatus.

Initially, when the power supply of the picture reading apparatus is turned ON by operation of operator, the picture reading apparatus becomes operative in accordance with the flowchart shown in FIG. 5.

Figure 6A:
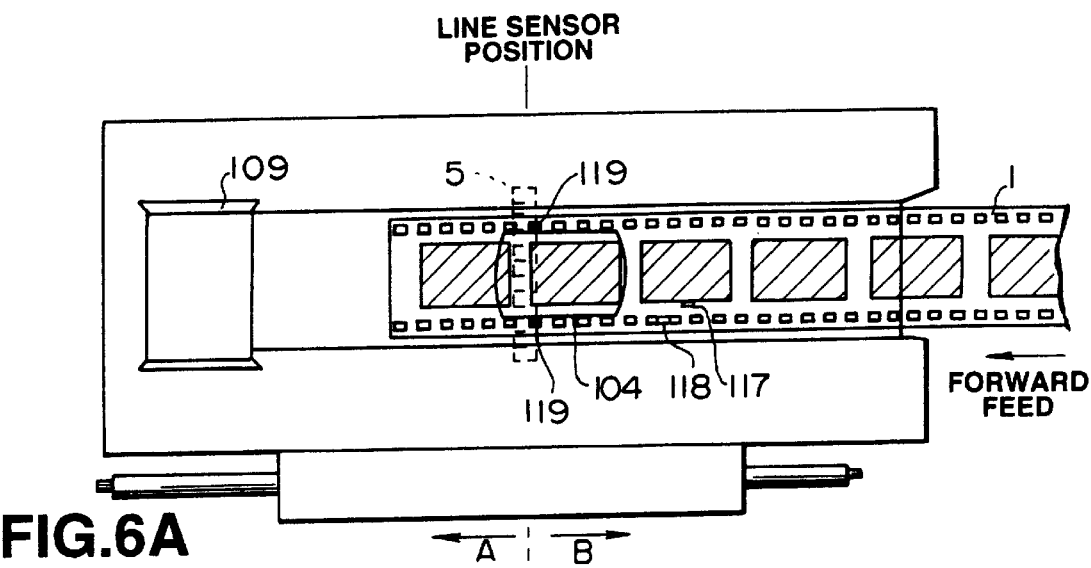
FIGS. 6A, 6B and 6C are views showing the positional relationship between the film carrier and CCD line sensor for explaining the operation of the film carrier.
Figure 6B:
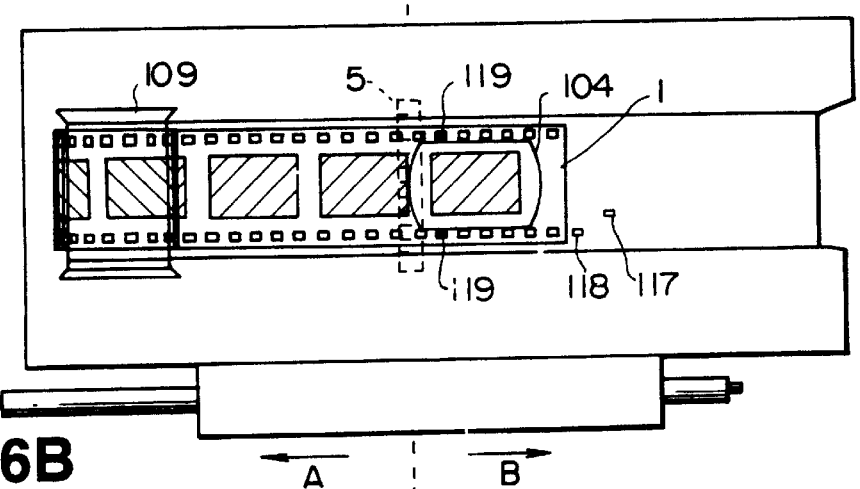
Figure 6C:
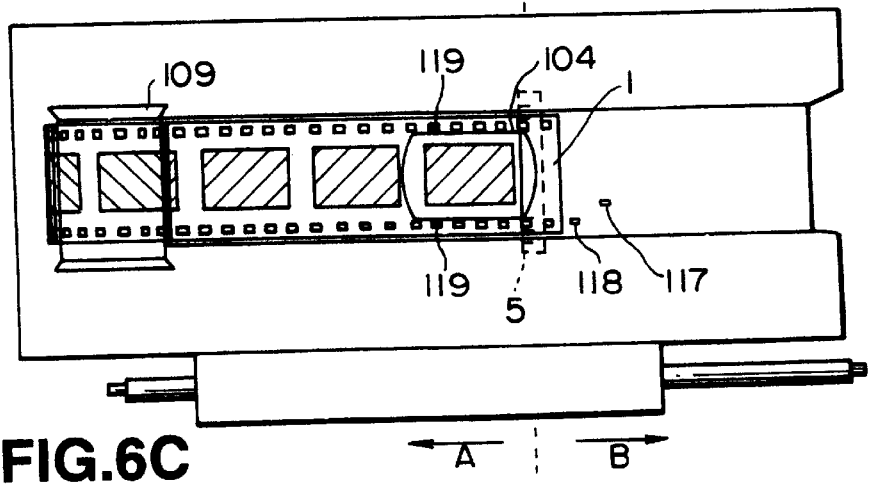

At step S1, preset of the scanner unit 10 is carried out. In a more practical sense, the control unit 40 allows the light source 3 to emit light in the state where optical film 1 does not exist. Further, the control unit 40 drives the carrier movement motor 12 in the state where the light source 3 is caused to emit light to move the film carrier 100 relative to the CCD line sensor 5. Then, the control unit 40 controls the scanner unit 10 and the signal processing unit 20 so as to convert an image pick-up signal obtained by receiving a light transmitted through the opening 104 and the holes 119 while moving the film carrier 100 into picture data to store it into the picture memory 23. Then, the control unit 40 implements picture processing to the picture which has been taken into the picture memory 23 to generate data indicating position of the left and right ends of the opening 104 and the position of the holes 119. Namely, the control unit 40 generates, as shown in FIG. 6A, for example, position data A indicating movement position of the film carrier 100 at which the position of the holes 119 is in correspondence with the position of the CCD line sensor 5. Similarly, the control unit 40 generates, as shown in FIG. 6B, for example, position data B indicating movement position of the film carrier 100 at which the left end of the opening 104 is in correspondence with the position of the CCD line sensor 5. In addition, the control unit 40 generates, as shown in FIG. 6C, for example, position data C indicating movement position of the film carrier 100 at which the position of the left end of the opening 104 is in correspondence with the position of the CCD line sensor 5. These generated position data A, B, C are, e.g., value of the number of step pulses delivered to the carrier movement motor 12, and are stored into the memory 41 of the control unit 40. When storing operation of these position data A, B, C is completed, the control unit 40 drives the carrier drive motor 12 on the basis of the position data A to move the film carrier 100 so that the position of the holes 119 becomes in correspondence with the position of the CCD line sensor 5. Thus, preset at the step S1 is completed.

Subsequently, at step S2, the control unit 40 judges as to whether or not the magneto-optical disc 32 is loaded into the recording/reproduction unit 30. As a result, when the magneto-optical disc 32 is loaded in the recording/reproduction unit 30, the processing operation shifts to step S3. In contrast, when the magneto-optical disc 32 is not loaded in the recording/reproduction unit 30, the processing of the step S2 is repeated to stand by (wait) until the magneto-optical disc 32 is loaded. Namely, in this embodiment, in consideration of capacity of the picture memory 23, the picture data which have been read by the main scan are sequentially recorded onto the magneto-optical disc 32.

At step S3, the control unit 40 judges on the basis of an output signal of the film detection sensor 117 whether or not the optical film 1 is inserted into the film carrier 100. As a result, when the optical film 1 is inserted into the film carrier 100, the processing operation shifts to step S4. In contrast, when the optical film 1 is not inserted into the film carrier 100, the processing of the step S3 is repeated to stand by (wait) until the optical film 1 is inserted.

At the step S4, when the control unit 40 detects at the step S3 that the optical film 1 has been inserted, it rotationally drives the film carrying motor 113. Thus, drive force from the film carrying motor 113 is transmitted to the film carrying roller 103 and the winding roller 109. Thus, these rollers 103, 109 are rotated. As a result, the optical film 1 is carried (transferred) in the forward feed direction.

At step S5, when the forward feed of the optical film 1 has been started at the step S4, reading of picture by the CCD line sensor 5, i.e., pre-scan is started. Drive of the CCD line sensor 5 in this pre-scan is not carried out in respective frame units, but the CCD line sensor 5 is continued to be driven in line units for a time period during which the optical film 1 is fed in the forward direction. Accordingly, an image pick-up signal outputted from the CCD line sensor 5 is an image pick-up signal at pictures of respective frames and the portions between frames. As a result, picture image of the optical film itself is stored into the picture memory 23. In the pre-scan in this example, the control unit 40 controls and/or drives the CCD line sensor 5, the A/D converter 21 and the film carrying motor 113 so that the number of samples in the vertical direction (in the main scanning direction of the CCD line 5) in one frame of the optical film becomes equal to 128 samples and the number of samples in the horizontal direction (in the sub-scanning direction of the CCD line sensor 5) in one frame becomes equal to 192 samples.

At step S6, pre-scan is carried out. As a result, the optical film 1 is wound onto the winding roller 109. When the initial end of the optical film 1 is passed through the film detection sensor 117, the control unit 40 detects "absence" of the film. Namely, the control unit 40 judges on the basis of an output signal of the film detection sensor 117 whether or not the optical film 1 is passed through the film detection sensor 117. As a result, when the optical film 1 has been passed through the film detection sensor 117, a predetermined number of step pulses are delivered to the film carrying motor 113. The reason why such step pulses are delivered is to allow the initial end of the optical film 1 to be passed through the CCD line sensor 5. By delivery of the predetermined number of step pulses, the optical film 1 is further carried (transferred). When the initial end thereof is passed through the CCD line sensor 5, the control unit 40 detects the initial end of the optical film 1 on the basis of the image pick-up signal outputted from the CCD line sensor 5. On the other hand, when the optical film 1 is not passed through the film detection sensor 117, the control unit 40 repeats the processing of the step S6.

At step S7, when the control unit 40 detects the initial end of the optical film 1 on the basis of the image pick-up signal of the CCD line sensor 5 at the step S6, it stops drive of the film carrying motor 113 to stop carrying (transfer) of the optical film 1.

At step S8, the control unit 40 analyzes picture data (picture image) stored in the picture memory 23 to judges, for each frame, positions on the picture memory 23 corresponding to the left and right ends of the frame to generate frame position data to store these frame position data into the memory 41 in a manner caused to correspond to respective frames. It is to be noted that the frame position data is data indicating positions of the right end and the left end of picture of frame. Namely, in the pre-scan at the step S5, the relative speed between the optical film 1 and the CCD line sensor 5 is caused to be high and the sampling rate is caused to be lower to such a degree that frame position data can be obtained.

At step S9, the control unit 40 initially reads out picture data from the picture memory 23 on the basis of the frame position data stored in the memory 41 to display, for each frame, picture images on the monitor unit 50. Then, an operator looks at the pre-scan picture images displayed for each frame on the monitor unit 50 to change the position of frame by operating keys provided on the keyboard 42. The reason why position of frame is changed in this way is as follows. Namely, since the control unit 40 judges, at the step S8, picture data stored in the picture memory 23 to determine position of frame, there is the possibility that it is impossible to precisely judge position of frame in such cases that, e.g., dark area exists at the left or right end of picture of photographed frame. Accordingly, in such a case, operator can adjust position of frame while observing the monitor unit 50. The control unit 40 corrects frame position data stored in the memory 41 on the basis of frame position thus adjusted to newly store it into the memory 41. Moreover, operator operates keys of the keyboard 42 while looking at picture image of frame displayed on the monitor unit 50, thus making it possible to correct color so that there result optimum colors every frames. With respect to color corrected frames, color correction data are generated. These color correction data are stored into the memory 41. Subsequently, at the steps S8 and S9, all data are generated. When those data are stored into the memory 41, the processing operation by the control unit 40 shifts to step S10.

At the step S10, the control unit 40 judges by using the keyboard 42 whether or not, e.g., operator instructs the main scan. As a result, when such an instruction is given, the processing operation shifts to step S11. In contrast, when such an instruction is not given, the control unit 40 stands by until this instruction is given.

At the step S11, when the numeric value indicating what frame caused to undergo the main scan is assumed to be n, and, e.g., operator inputs n from the keyboard 42, the control unit 40 judges whether n is 1 or 2. When n is 1 or 2, the processing operation shifts to step S12. In contrast, when otherwise, the processing operation shifts to step S19. Namely, when the control unit 40 carries out the main scan with respect to the first frame or the second frame, its processing operation shifts to the step S12.

At the step S12, the control unit 40 drives the carrier movement motor 12 on the basis of position data A stored in the memory 41 to move the film carrier 100 so that it is placed in the state shown in FIG. 6A. It is to be noted that in the case where the film carrier 100 has been already moved to the position shown in FIG. 6A, the processing of the step S12 becomes unnecessary.

At step S13, the control unit 40 drives the film carrying motor 113 to carry out backward feed (feed in opposite direction) of the optical film 1. Simultaneously with the backward feed of the optical film 1, the control unit 40 drives the CCD line sensor 5, thus making it possible to detect presence or absence of hole of perforation of the optical film 1 photographed through the holes 119. Accordingly, the number of holes of perforations is counted on the basis of the image pick-up signal from the CCD line sensor 5 to drive the film carrying motor 113 in such a manner that the picture of the first frame faces to the opening 104. In this example, the reason why detection of perforation is carried out by the image pick-up signal caused to be through the holes 119 of the CCD line sensor 5 as stated above is that since the optical film 1 does not reach the perforation detection sensor 118 at the time point where positioning of pictures of the first frame and the second frame is started, an output signal of the perforation detection sensor 118 cannot be used for positioning of film.

At step S14, the control unit 40 drives the carrier drive motor 12 on the basis of position data B stored in the memory 41 to allow the film carrier 100 to undergo positioning such that it is located at the position shown in FIG. 6B.

At step S15, the control unit 40 carries out the main scan. In this main scan, the film carrying motor 113 is in stopped state, and the film carrier 100 is moved from the position shown in FIG. 6B to the position shown in FIG. 6C by the carrier movement motor 12. Thus, the picture data which have been read in every line by the CCD line sensor 5 are sequentially stored into the picture memory 23. The CCD line sensor 5 is adapted so that the start timing of read operation and the end timing the read operation are controlled on the basis of frame position data stored in the memory 41 by the control unit 40. In this main scan, step pulses of which number corresponds to position data C stored in the memory 41 are delivered to the carrier movement motor 12. Thus, picture data are read in every line by the CCD line sensor 5. In this main scan, the control unit 40 controls and/or drives the CCD line sensor 5, the A/D converter 21 and the carrier movement motor 12 so that the number of samples in the vertical direction (in the main scanning direction of the CCD line sensor 5) in one frame becomes equal to 2048 samples and the number of samples in the horizontal direction (in the sub scanning direction of the CCD line sensor 5) in one frame becomes equal to 3072 samples. Namely, in this main scan, the relative speed between the optical film 1 and the CCD line sensor 5 is caused to be lower and the sampling rate thereof is caused to be higher as compared to the pre-scan, thus to carry out taking-in of picture data at high resolution suitable for picture.

At step S16, the control unit 40 judges whether or not the CCD line sensor 5 has read the last line of picture of frame designated by the frame position data. When the CCD line sensor 5 has read the last line, the processing operation shifts to step S17. In contrast, when the CCD line sensor 5 has not yet read such last line, the control unit 40 stands by until it reads the last line.

At the step S17, the control unit 40 controls the picture memory 23 so as to read out picture data of one frame (2048×3072 samples) stored in the picture memory 23 to deliver it to the recording/reproduction unit 30.

At step S18, the control unit 40 increments value of n in order to carry out the main scan of the next frame. Thus, the processing operation returns to the step S11. At this step S11, when the control unit 40 judges on the basis of the value of n that the frame to be subjected to the main scan is the third frame or frames succeeding thereto, the processing operation shifts to step S19.

At the step S19, the control unit 40 drives the film carrying motor 113 to feed the optical film 1 further in the opposite direction. At this time, since perforations are passed through the portion on the perforation detection sensor 118, the control unit 40 can carry out positioning of the optical film 1 on the basis of an output signal of the perforation detection sensor 118. Moreover, simultaneously with the backward feed operation of the film, the control unit 40 drives the carrier drive motor 12 to allow the film carrier 100 to be located at the position shown in FIG. 6B. Namely, in this picture reading apparatus, since feed of the optical film 1 on the film carrier 100 and movement of the film carrier 100 are carried out at the same time, setting for the main scan can be carried out at an extremely high speed. When setting (preparation) for carrying out the main scan is completed, the processing operation by the control unit 40 shifts to step S20. The processing at this step S20 is the same as that at the step S15. When the main scan is completed, the processing operation by the control unit 40 shifts to step S21.

At the step S21, when the control unit 40 judges that the CCD line sensor 5 has read picture of frame designated by frame position data similarly to the case of the step S16, it stops drive of the CCD line sensor 5. Thereafter, the processing operation shifts to step S22.

At the step S22, the control unit 40 controls the picture memory 23 so as to read out picture data of one frame stored in the picture memory 23 to deliver it to the recording/reproduction unit 30.

At step S23, the control unit 40 increments value of n in order to carry out the main scan of the next frame. Thus, the processing operation shifts to step S24.

At the step S24, the control unit 40 judges whether or not n reaches the number of frames obtained at the step S8, i.e., the main scan of all frames is completed. As a result, if so, the processing operation shifts to step S25. If not so, the processing operation returns to the step S19.

At the step S25, the control unit 40 rotationally drives the film carrying motor 113 at a high speed to eject the optical film 1 from the film carrier 100. Thus, all the reading operations have been completed.

It is to be noted that this invention is not limited to the above-described embodiment. While, in the above-described embodiment, explanation has been given in connection with, e.g., the picture reading apparatus for reading pictures (pictorial images) recorded on the optical film 1, this invention can be similarly applied also in connection with the case where data, e.g., DX codes, etc. recorded on the optical film 1 are read.

INDUSTRIAL APPLICABILITY

Also as is clear from the foregoing description, the picture reading apparatus according to this invention is operative so that, in the pre-scan (mode), it controls the CCD line sensor 5 and the film carrying roller 103 so that plural pictures (pictorial images) recorded on the optical film 1 are read at a predetermined sampling rate in order from the latest frame to generate frame position data indicating position such as left and right ends of frame, etc. Further, this picture reading apparatus is operative so that, in the main scan (mode), it controls, in controlling the CCD line sensor 5 and the film carrier 100 so that plural pictures recorded on the optical film are read at a sampling rate higher than the predetermined sampling rate in order from the oldest frame, the reading start and end timings of the CCD line sensor 5 on the basis of the frame position data obtained by the pre-scan. As a result, this picture reading apparatus can precisely obtain picture data of pictures of frames in the state where no positional shift takes place. In addition, since the pre-scan is carried out at a lower sampling rate, it is possible to obtain frame position data in a short time.

What is claimed is:

1. An apparatus for digitizing pictures, the apparatus comprising:

a light source;

a film holding plate having a plurality of openings that include a picture opening and a perforation opening, the perforation opening corresponding with perforation holes formed in a strip of film;

a carriage connected to the film holding plate, the carriage being movable with respect to the light source so that, when the carriage is in a first position, light from the light source passes through the perforation opening and a portion of the picture opening; and an imager connected to the carriage, the imager having an input surface, and digitizing an image formed on the input surface from light passing through the perforation opening and the portion of the picture opening when the carriage is in the first position.

2. The apparatus of claim 1 and further comprising:

a film feeder connected to the film holding plate and the carriage that steps a strip of film through the film holding plate, the imager imaging each step of the strip of film to form a digital image of the strip of film; and a controller that determines position information of the strip of film by evaluating the digital image that was captured by the perforation opening.

3. The apparatus of claim 2 wherein the digital image includes pictures, regions between pictures, and perforation holes.

4. The apparatus of claim 1 wherein when the carriage is in a second position, light from the light source passes through a first end of the picture opening.

5. The apparatus of claim 4 wherein when the carriage is in a third position, light from the light source passes through a second end of the picture opening, the second end being opposite to the first end.

6. The apparatus of claim 5 wherein the carriage includes a roller that moves the strip of film moves across the picture opening of the film holding plate in a direction.

7. The apparatus of claim 6 wherein the carriage moves in the direction.

8. The apparatus of claim 1 wherein the carriage includes a roller that moves the strip of film across the picture opening of the film holding plate in a first direction and a second direction, the second direction being opposite to the first direction.

9. The apparatus of claim 8 wherein the carriage moves in the first direction and the second direction.

10. The apparatus of claim 9 wherein the roller moves the strip of film moves across the picture opening in the first direction at the same time that the carriage moves in the second direction.

11. The apparatus of claim 7 wherein the carriage moves in the direction at the same time that the strip of film does not move across the picture opening.

12. The apparatus of claim 7 wherein the carriage includes:

first gears connected to the roller; and a first motor for driving the first gears.

13. The apparatus of claim 12 and further comprising:

second gears connected to the carriage; and a second motor for driving the second gears.

14. The apparatus of claim 9 wherein the carriage includes:

first gears connected to the roller; and a first motor for driving the first gears.

15. The apparatus of claim 12 and further comprising:

second gears connected to the carriage; and a second motor for driving the second gears.

* * * * *